(12) United States Patent
Archambault et al.

(10) Patent No.: US 8,194,841 B2
(45) Date of Patent: *Jun. 5, 2012

(54) MEETING LOBBY FOR WEB CONFERENCING

(75) Inventors: Anne M. Archambault, Seattle, WA (US); Pavel Curtis, Los Altos, CA (US); Brian Meek, Redmond, WA (US); Jeremy B. Smith, Redmond, WA (US); Douglas Wyatt, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/211,261

(22) Filed: Aug. 16, 2011

(65) Prior Publication Data

US 2011/0300841 A1    Dec. 8, 2011

Related U.S. Application Data

(63) Continuation of application No. 12/862,713, filed on Aug. 24, 2010, now Pat. No. 8,005,203, which is a continuation of application No. 11/055,888, filed on Feb. 11, 2005, now Pat. No. 7,809,124.

(51) Int. Cl.
*H04M 3/56* (2006.01)
*H04N 7/15* (2006.01)
*H04L 12/18* (2006.01)
*G06F 15/16* (2006.01)

(52) U.S. Cl. ............... 379/202.01; 348/14.08; 370/260; 370/261; 370/262; 379/203.01; 455/416; 709/204

(58) Field of Classification Search ...... 348/14.08–14.1; 370/260–262; 379/202.01–206.01; 455/416; 709/204, 205

See application file for complete search history.

(56) References Cited

U.S. PATENT DOCUMENTS

| | | | |
|---|---|---|---|
| 7,398,295 B2 * | 7/2008 | Shoroff et al. | 709/204 |
| 7,809,124 B2 * | 10/2010 | Archambault et al. | 379/202.01 |
| 8,005,203 B2 * | 8/2011 | Archambault et al. | 379/202.01 |
| 2004/0246332 A1 | 12/2004 | Crouch | |
| 2005/0058088 A1 | 3/2005 | Decker et al. | |
| 2005/0254440 A1 | 11/2005 | Sorrell | |

* cited by examiner

*Primary Examiner* — Harry Hong
(74) *Attorney, Agent, or Firm* — Perkins Coie LLP (57) ABSTRACT

A conferencing system provides the scheduling of virtual meetings with meeting lobbies so that a meeting presenter can conduct a virtual meeting without the need to send out invitations to attendees. A person that wants to conduct a virtual meeting can schedule with the conferencing system a meeting with a meeting lobby. The meeting lobby has an address, but there is no associated privileged information, such as a meeting password. Would-be meeting attendees use the meeting lobby address to enter the meeting lobby as visitors in the lobby, and request to enter the meeting from the meeting lobby. A meeting presenter can then either grant authorization for a visitor in the meeting lobby to enter the meeting, or deny authorization for a visitor in the meeting lobby to enter the meeting. If a visitor in the meeting lobby is denied authorization to enter the meeting from the meeting lobby, the conferencing system removes the visitor from the meeting lobby.

20 Claims, 5 Drawing Sheets

MEETING LOBBY FOR WEB CONFERENCING

CROSS REFERENCE TO RELATED APPLICATION

The present application is a Continuation of U.S. patent application Ser. No. 12/862,713, filed Aug. 24, 2010, now U.S. Pat. No. 8,005,203 issued Aug. 23, 2011 and entitled "MEETING LOBBY FOR WEB CONFERENCING," which is a Continuation of U.S. patent application Ser. No. 11/055,888, filed Feb. 11, 2005, now U.S. Pat. No. 7,809,124 issued Oct. 5, 2010 and entitled "MEETING LOBBY FOR WEB CONFERENCING," both of which are incorporated herein in their entirety by reference.

TECHNICAL FIELD

The described technology is directed generally to conferencing services and, more particularly, to enabling a host to invite would-be attendees of a conferencing session without issuing invitations.

BACKGROUND

With the proliferation of computers and the advent of the Internet, and in particular, the maturing of the World Wide Web ("web"), real-time conversations between conversation participants via their computer systems are becoming increasingly common. These conversations, which take place virtually over computer networks, are ever replacing the traditional face-to-face meetings.

Web conferencing applications are increasingly being used to conduct these virtual meetings. Typically, a person wanting to conduct a meeting, also referred to as a "presenter" in the meeting, schedules a meeting with a conferencing service. Alternatively, a meeting organizer can schedule the meeting with the conferencing service on behalf of this person. The person then invites selected people to attend the meeting by sending those people invitations. The invitation contains privileged information, such as a meeting time, meeting location—i.e., a universal resource locator (URL), meeting identifier, and meeting password, the invitee will need to be admitted to the meeting.

There may be more than one class of people in the meeting. For example, the person wanting to conduct the meeting may request one or more invitees to be presenters in the meeting. A meeting presenter has higher privileges than a meeting attendee. Moreover, the person originally wanting to conduct the meeting may or may not be a presenter in the meeting. In this instance, the person wanting to conduct the meeting can provide these invitees—i.e., the invitees who are requested to be presenters—with a different password to convey that higher level of privilege.

At a designated meeting time, the invited person uses a computing device to go to the meeting URL and submits the meeting identification and password to the conferencing service. The conferencing service verifies whether the person submitting the meeting information is authorized to attend the meeting, either as an attendee or a presenter. If the conferencing service verifies that the person is authorized to attend the meeting as an attendee, the conferencing service identifies the person as an attendee, launches an attendee console on the person's computing device screen, and adds the person to the list of people currently in the meeting. If the conferencing service verifies that the person is authorized to attend the meeting as a presenter, the conferencing service identifies the person as a presenter, launches a presenter console on the person's computing device screen, and adds the person to the list of people currently in the meeting.

One drawback to these conferencing applications is the use of invitations to invite people to attend a meeting. The invitations specify the time and location of the meeting and the password needed to gain access into the meeting, and separate invitations are issued for each meeting. When a large number of meetings are scheduled, sending out invitations for each of the scheduled meetings may become increasingly cumbersome and impractical. This is especially true in the instance where meeting are regularly scheduled, for example, at 10 AM every Monday, Wednesday, and Friday, in which case the invitations are likely to have a large amount of redundant information. Another drawback is that the conferencing applications typically admit any person submitting the proper credentials—e.g., a password. Because the invitations are sometimes transmitted or provided to invitees in the "clear," the person may have obtained the password by unscrupulous means.

It would be desirable to have a technique that allows a person to invite people to attend scheduled virtual meetings without having to issue invitations to every invited person for every scheduled meeting.

DETAILED DESCRIPTION

A method and system for conducting conferencing sessions, such as meetings, without the use of invitations is provided. In one embodiment, each meeting has an associated meeting lobby, and the lobby—i.e., the lobby feature—may or may not be enabled by default. Stated differently, if the lobby feature is enabled by default, an organizer not wanting to use a lobby for a scheduled meeting can disable the lobby feature for the meeting. Conversely, if the lobby feature is disabled by default, an organizer wanting to use a lobby for a scheduled meeting can request or enable the lobby feature for the meeting. As used herein, an "organizer" or a "meeting organizer" refers to a person or process that schedules a meeting, and may include a presenter in the meeting. The meeting lobby is a virtual waiting room for would-be meeting attendees trying to gain access to a meeting. The meeting organizer and presenters can do the equivalent of opening the lobby door and selectively granting access to the meeting to individual users in the lobby—i.e., lobby visitors. The meeting lobby can be easily set up by the meeting organizer and easily entered by the attendees and visitors, and allows the organizer and presenters to conduct meetings without the need to send out invitations to attendees.

In one embodiment, a meeting organizer that wants to schedule a meeting with a conferencing service schedules a meeting and requests the use of a meeting lobby for the scheduled meeting. In scheduling the meeting, the meeting organizer establishes privileged information (meeting identifier and password) to enable a presenter to enter and conduct the meeting. Meeting lobbies have fixed and easily remembered addresses—e.g., web coordinates such as a URL—that can be discovered by would-be attendees or other interested persons. The lobby address may be shared openly, and there is no associated privileged information, such as a meeting password. For example, the presenter can include the lobby address—i.e., the fixed location of the lobby—in email signatures, business cards, web sites, etc. or simply described verbally.

A person wanting to enter the meeting lobby for a particular meeting can execute a web browser on a computing device and direct the web browser to go to the lobby address (lobby entry URL), which is served by a conferencing service server or other suitable computing system. This may cause the server to display a web form on the person's computing device screen, which may request the person's name (and any other auxiliary information), but no meeting password. When the person submits this form, the server processes the information in the form—e.g., checks to make sure that the required information requested in the form has been received—and displays a lobby page on the person's computing device screen. The display of the lobby page serves as an indication that the person is in the meeting lobby. The lobby page may include logic, for example, in a hidden frame, which periodically makes requests to enter the meeting.

In one embodiment, lobby visitors can interact amongst themselves through chat, voice or other modalities. For example, the lobby page may provide a pane or multiple panes through which the lobby visitors can interact amongst themselves. The meeting organizer and/or presenters may also broadcast through chat, voice and other modalities to the visitors in the meeting lobby. Moreover, the meeting lobby can be customized to reflect the owner's personality or the meeting's nature.

Meanwhile, the server adds the person's name or identification, which may be obtained from the web form, to a list of visitors waiting in the lobby. The server shares or otherwise makes available the list of lobby visitors to all presenters in the meeting. For example, the server may broadcast an RPC message to each presenter when a change is detected in the list of lobby visitors—e.g., a new visitor is added to/removed from the list of lobby visitors. Moreover, the server may also provide a notification, such as a "toast" notification or other visual notification, to all presenters when new visitors are added to the list.

Any presenter in the meeting can bring up a dialog, such as a Meeting Lobby dialog or other suitable interface, to view the current list of lobby visitors and control meeting access from the lobby. Through the dialog, a presenter can "grant" or "deny" access to selected lobby visitors, or take no action. The grant or deny action sends a message form the presenter's computing device back to the server.

Upon receiving a grant action for a lobby visitor, the server admits the lobby visitor into the meeting by assigning the admitted lobby visitor to an appropriate role for admitted lobby visitors, such as an attendee of the meeting. The server then displays a meeting audience console on the lobby visitor's computing device screen. The lobby page is replaced by a meeting attendee console. The server also removes the admitted visitor from the list of lobby visitors and may add the admitted visitor to a list of meeting attendees. Conversely, upon receiving a deny action for a lobby visitor, the server removes the lobby visitor from the list of lobby visitors and the meeting lobby, and replaces the lobby page with a message informing the visitor that entry was refused.

In one embodiment, the server may notify, for example, by email, the meeting organizer and/or presenter when new visitors enter the meeting lobby. By way of example, Mario may be discussing the new design for a new widget on the phone with Loretta. Needing to draw his latest proposal for Loretta, Mario tells Loretta to meet him in his virtual office. Loretta knows exactly what Mario is referring to as they often meet in his "virtual office." Using her computer, Loretta clicks on the hyperlink for Mario's virtual office which is part of his email signature. In response, a server hosting the conferencing service loads a lobby entry page on Loretta's computer. Loretta fills out her name and waits for Mario in the meeting lobby. The server notifies Mario by email that Loretta is waiting for him in the lobby. Mario then uses his computer to join the meeting and grants her access to the meeting.

In one embodiment, meeting presenters can control the start of a meeting by granting access to all attendees at once. Meeting presenters can also lock their meeting and prevent unauthorized attendees from joining their meeting. A technical advantage is that this can help limit the meeting costs. By way of example, Jörg, who is a sales representative for a software company, may conduct multiple, back-to-back hourly web meeting demos of his company's software. Wanting to let anyone interested in his demos attend his demos and just show up on the fly, he sets up a meeting with a meeting lobby and publishes the address of the lobby on the demo page on his corporate website. Maria is interested in this company's software, and finds out about the hourly demos on the company's website. The current time may be 10:50 AM, and knowing a new demo will start at 11:00 AM, Maria uses her computer and enters the meeting lobby and waits to be granted access to the meeting. The server hosting the meeting notifies Jörg that Maria has entered the lobby. But Jörg may still be wrapping up his previous demo. At 10:55 AM, Jörg ends the demo and can now let new attendees into the meeting. Jörg grants access to everyone in the lobby. As soon as Jörg grants her access to the meeting, Maria automatically joins the sales demo. At 11:00 AM, Jörg can lock access to the meeting to prevent new attendees from entering and disturbing his meeting.

In one embodiment, the lobby may support different categories of lobby visitors, such as lobby visitors who are unauthorized, who are unauthorized but authenticated, and those who are authorized. A lobby visitor who is unauthorized refers to a person who entered the lobby by providing only a name on the web form, and the server could not use the name to authenticate the person as the person having that submitted name. A lobby visitor who is unauthorized but authenticated refers to a person who entered the lobby by providing a name and another item of information, such as a password, on the web form, and the server was able to use the name and password to authenticate the person as the person having the submitted name. The server may use any of a variety of well-known authentication techniques to ensure that the person who submitted the name is actually that person and not an imposter. A lobby visitor who is authorized is a person who possessed the right, for example, either by submitting a meeting password or by being on a meeting attendee list, to enter the meeting, but was placed in the meeting lobby. For example, the person may have requested to enter the meeting after the meeting was locked. In this instance, the server may place the person in the meeting lobby.

One technical advantage is that meeting lobbies allow meeting organizers to organize meetings without having to pre-send invitations. Would-be meeting attendees can be granted access to a meeting on the fly without having been previously authenticated or authorized.

The various embodiments of the method and system for gathering and reporting screen resolution information of attendees of a collaboration session, and their advantages are best understood by referring to FIGS. 1-6 of the drawings. The elements of the drawings are not necessarily to scale, emphasis instead being placed upon clearly illustrating the principles of the invention. Throughout the drawings, like numerals are used for like and corresponding parts of the various drawings.

Figure 1:
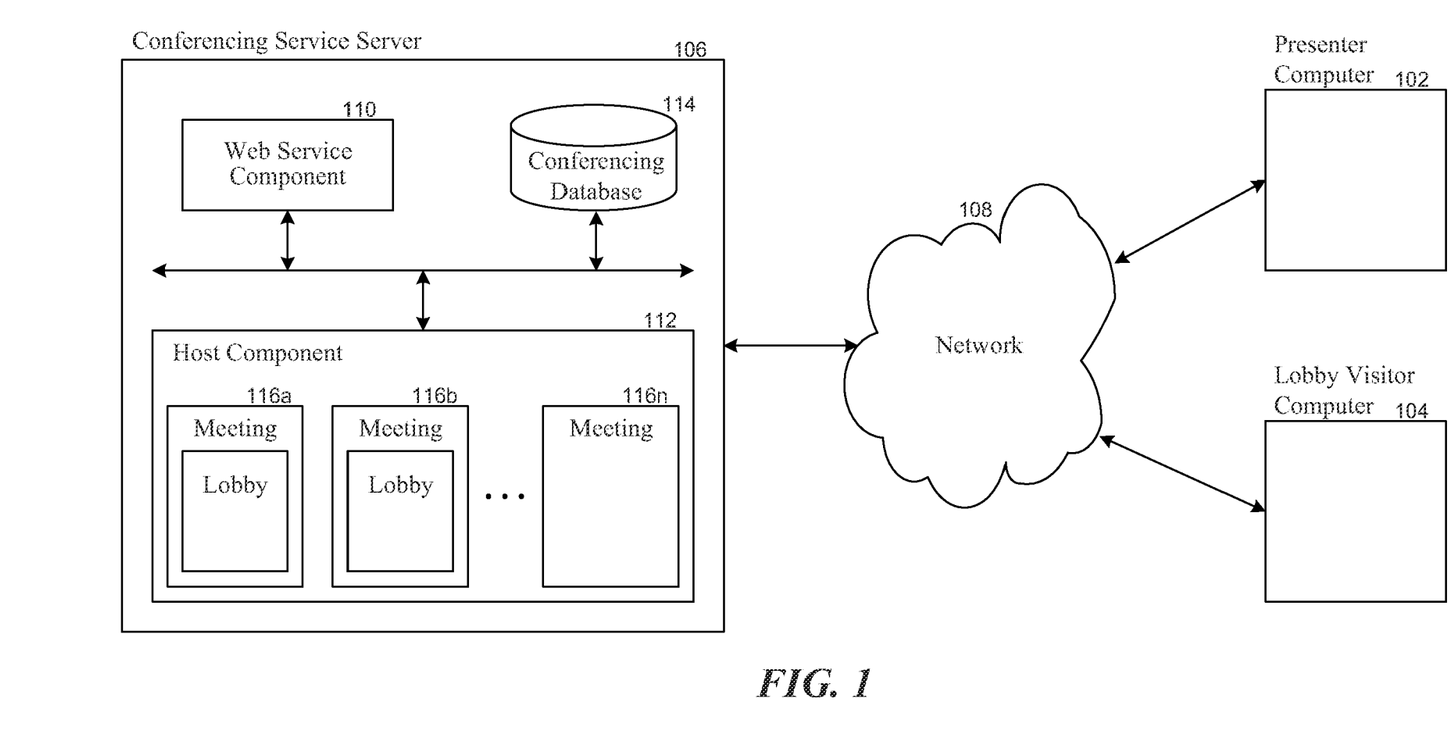
FIG. 1 is a block diagram illustrating an environment in which a conferencing system that provides meetings with optional meeting lobbies may operate.

FIG. 1 is a block diagram illustrating an environment in which a conferencing system that provides meetings with optional meeting lobbies may operate. As depicted, the environment comprises a presenter computer 102, a lobby visitor computer 104, and a conferencing service server 106, each coupled to a network 108. As used herein, the terms "connected," "coupled," or any variant thereof, means any connection or coupling, either direct or indirect, between two or more elements; the coupling of connection between the elements can be physical, logical, or a combination thereof.

The presenter computer may be any type of computer system that provides its user—e.g., a meeting presenter—the ability to load and execute software programs and the ability to access a network, such as network 108, and communicate with the conferencing service server. Similarly, the lobby visitor computer may be any type of computer system that provides its user—e.g., a meeting lobby visitor—the ability to load and execute software programs and the ability to access a network, such as network 108, and communicate with the conferencing service server. In one embodiment, the presenter computer and the lobby visitor computer are each executing a suitable operating system program that supports the loading and executing of application programs, such as a web browser or other suitable user interface program, for interacting with and accessing the services provided on the conferencing service server.

The conferencing service server provides the conferencing service, such as MICROSOFT LIVE MEETING, by "hosting" conferencing sessions, such as meetings. As depicted in FIG. 1, the conferencing service server comprises a web service component 110, a host component 112, and a conferencing database 114. In general terms, the web service component handles the scheduling of meetings and authentication of users. In one embodiment, the web service component serves the meeting lobby entry URL by providing a web form that requests information, such as a name and any other auxiliary information, but no meeting password. When a user—e.g., a person—interested in entering a meeting lobby uses a computer, such as the lobby visitor computer, and requests and submits the information requested in the web form, the web service component assigns the user a lobby role, such as "unauthorized," "unauthorized but authenticated," "authorized," etc., creates a new authorization identification for the user, creates an authentication record, which contains the user's name and which identifies the user as a lobby visitor, and delivers a response that directs the user's browser to a lobby page for the requested meeting on the host component. The web service component may also send the authorization identification that was created for the user to the host component.

The host component "hosts" the actual virtual meetings. As depicted, the host component is shown as hosting a plurality of meetings 116a-n, which may or may not have respective meeting lobbies. For example, some meetings may have been scheduled with the lobby feature as represented by meetings 116a and 116b, while other meetings may have been scheduled without the lobby feature as represented by 116n.

In general terms, the host component processes the user's request for the lobby page (which was requested as a result of the web service component directing the user's browser to the lobby page as described above) by verifying that the user is authorized to enter the meeting lobby and presenting the user with an appropriate meeting lobby page. The host component notifies the meeting presenters of the presence of the newly arrived visitor in the meeting lobby, and also processes requests from the visitor to enter the meeting from the lobby and the decision of the presenters as to whether or not the visitor is granted permission to join the meeting. The host component is described further below.

In general terms, the conferencing database is shared by the web service component and the host component, and functions as a repository for the data and information used by the components of the conferencing service server to facilitate the meeting and meeting lobby features as disclosed herein. For example, the conferencing database may represent and/or store information and data such as the properties of each meeting, the authentication records, the credentials of users authorized to enter each meeting, etc.

The aforementioned aspects of the conferencing service server are only illustrative and are not intended to suggest any limitation as to the implementation of the illustrated components and/or the scope of use or functionality of the conferencing service server. For example, in various embodiments, the web service component, the host component, and the conferencing database need not be implemented as part of the same computing system, but may be implemented in one or more different computing systems.

Network 108 is a communications link that facilitates the transfer of electronic content between, for example, the attached computers. In one embodiment, the network includes the Internet. It will be appreciated that the network may be comprised of one or more other types of networks, such as a local area network, a wide area network, a point-to-point dial-up connection, a cell phone network, and the like.

The computer systems of the conferencing service server, presenter computer, and lobby visitor computer may include a central processing unit, memory, input devices (e.g., keyboard and pointing devices), output devices (e.g., display devices), and storage devices (e.g., disk drives). The memory and storage devices are computer-readable media that may contain instructions that implement the conferencing system. In addition, the data structures and message structures may be stored or transmitted via a data transmission medium, such as a signal on a communications link. Various communication links may be used, including network 108.

Embodiments of the conferencing system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The conferencing system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

The operating environment illustrated in FIG. 1 is only one example of a suitable operating environment and is not intended to suggest any limitation as to the scope of use or functionality of the conferencing system. As such, even though the environment, as well as the discussion of some the various embodiments of the conferencing system are described in conjunction with one presenter, one lobby visitor, and one meeting with a meeting lobby, one skilled in the art will appreciate that the described techniques can be adapted to work with multiple presenters, multiple lobby visitors, and/or multiple meetings with meeting lobbies. Moreover, one skilled in the art will appreciate that the meeting lobby concept can be readily adapted to other forms of virtual conferencing and collaboration.

In the discussion that follows, various embodiments of the conferencing system are further described in conjunction with a variety of illustrative examples. It will be appreciated that the embodiments of the conferencing system that provides meetings with meeting lobbies may be used in circumstances that diverge significantly from these examples in various respects.

Figure 2:
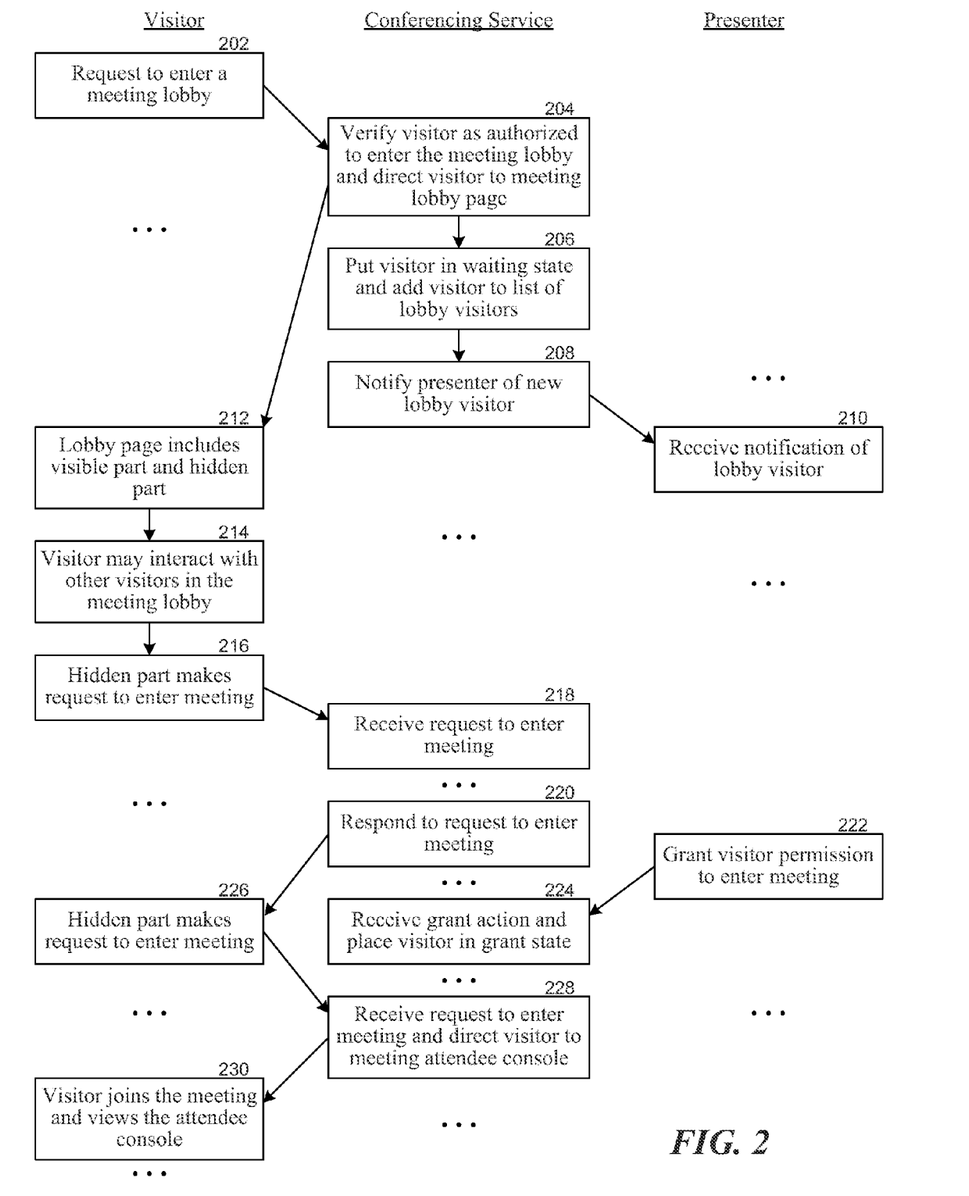
FIG. 2 is a flow diagram illustrating the processing of the host component of the conferencing service server, according to one embodiment.

FIG. 2 is a flow diagram illustrating the processing of the host component of the conferencing service server, according to one embodiment. By way of example, a meeting organizer may have requested to schedule a meeting having a meeting lobby with the conferencing service server, and provided the identity of at least one meeting presenter. In block 202, a visitor interested in entering a meeting lobby makes a request to enter the meeting lobby to the conferencing service server. As discussed above, the web service component of the conferencing service server may assign the visitor a lobby role, create a new authorization identification for the visitor, create an authentication record, deliver a response that directs the user's browser to a lobby page for the requested meeting on the host component, and send the authorization identification that was created for the visitor to the host component.

In block 204, when the host component receives the visitor's request for the lobby page, the host component verifies that the visitor is authorized to enter the meeting lobby by, for example, querying a shared database, such as the conferencing database, for the authorization identification supplied by the visitor. The result of the query may include the visitor's name and the lobby role. If the visitor is authorized to enter the meeting lobby, the host component displays a lobby page on the visitor's browser. In block 206, the host component puts the visitor in a waiting state and adds the visitor's name to a list of visitors waiting in the lobby. The visitor's name may be obtained from, for example, the authentication record. In block 208, the host component notifies the meeting presenters of the new lobby visitor. For example, the host component may broadcast a message, such as an RPC message, to each presenter as the list of lobby visitors changes.

In block 210, a meeting presenter receives notification of the lobby visitor. For example, the presenter may receive a "toast" notification, for example, on the presenter's meeting console, when new visitors are added to the meeting lobby. In one embodiment, the presenter may be able to view the list of lobby visitors by bring up a dialog—e.g., a Meeting Lobby dialog—or window to view the current list. The presenter may also be provided an email or other suitable notification, for example, if the presenter has not yet joined the meeting.

Returning to the visitor, in block 212, the lobby page displayed on the visitor's browser may include a frameset having a visible part and a hidden part. In one embodiment, text in the visible part may identify the meeting and welcome the visitor as a visitor in the lobby. The visible part may include frames that allow the user to interact with other visitors in the meeting lobby through chat, voice, and/or other modalities. The visible part may further include frames that allow the user to receive broadcasts, for example, through chat, voice, and/or other modalities, from the meeting organizer and/or presenters. In block 214, while the visitor is in the meeting lobby, the visitor may interact with the other visitors in the lobby. In block 216, the frame URL of the hidden part of the lobby page makes a request, for example, a lobby/wait request—to the conferencing service server, requesting that the visitor be allowed to enter the meeting from the lobby. While the visitor is in the waiting state, the hidden part of the lobby page displayed in the visitor's browser continues to make periodic lobby/wait requests to the conferencing service server until the visitor's state changes.

In block 218, the host component receives the lobby/wait request sent by the visitor. The host component responds to a lobby/wait request immediately if the visitor's state changes, but also responds after some predetermined period of time, which is configurable, even if the visitor's state has not changed. This is to prevent a proxy or something else in the client-server communication path from timing out the request. In block 220, not having received any indication from the presenter as to whether or not the visitor is to be granted admission into the meeting, the host component responds to the outstanding lobby wait request to prevent the request from timing out. In one embodiment, lobby/wait requests for the lobby visitors are each waiting on a separate condition variable in the conferencing service server, as described above.

In block 222, the presenter grants the visitor permission to enter the meeting from the meeting lobby. In one embodiment, the presenter can grant or deny access to selected lobby visitors using the dialog or window that is used to display the list of lobby visitors, and each of these actions sends a message, such as an RPC message, to the host component.

In block 224, the host component receives the grant action sent by the presenter. In one embodiment, in response to the grant action, the host component upgrades the visitor's authentication record to the appropriate role for admitted lobby visitors, for example, attendee, puts the visitor into a granted state, and appropriately notifies any pending—i.e., outstanding—condition variable on which the visitor may be waiting. In response to a deny action, the host component puts the visitor into a denied state, and appropriately notifies any pending condition variable on which the visitor may be waiting.

In block 226, the frame URL of the hidden part of the lobby page makes another lobby/wait request to the conferencing service server, requesting that the visitor be allowed to enter the meeting from the lobby.

In one embodiment, the host component's response to a lobby/wait request depends on the visitor's state at the time of the response. If the visitor's state is still waiting, the response causes the visitor's browser to make another lobby/wait request, as in block 226. If the visitor's state is granted, the response replaces the lobby page in the visitor's browser with a request to launch a meeting audience console, such as an attendee console. In this manner, just as if the visitor had entered the meeting by supplying a meeting password to the web service component; this will now succeed because the host component upgraded the visitor's authentication record. If the visitor's state is denied, the response replaces the lobby page in the visitor's browser with a message informing the visitor that entry was refused.

In block 228, the host component receives the lobby/wait request sent by the visitor. The host component may determine from, for example, the visitor's authentication record that the visitor is in a granted state, and respond to the lobby/wait request by replacing the lobby page in the visitor's browser with a request to launch an attendee console for the meeting. In block 230, the attendee joins the meeting and views the attendee console.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

Figure 3:
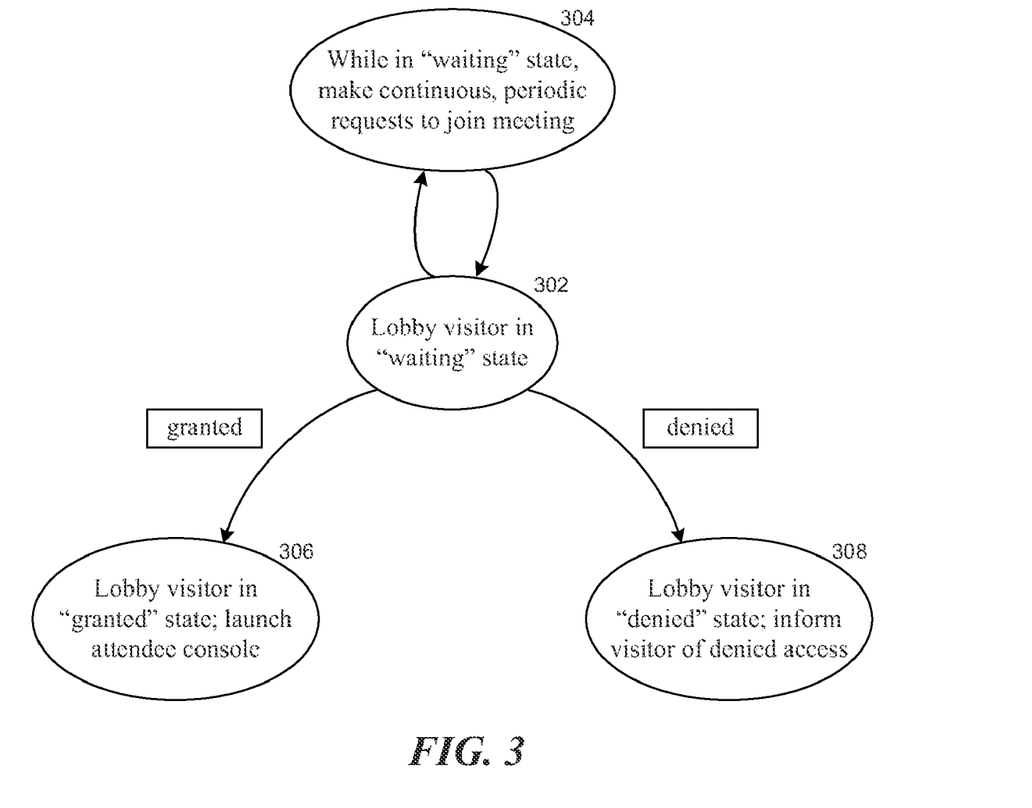
FIG. 3 is a diagram illustrating the state transitions for a lobby visitor, according to one embodiment.

FIG. 3 is a diagram illustrating the state transitions for a lobby visitor, according to one embodiment. When a lobby visitor initially enters a meeting lobby, the lobby visitor is placed in a waiting state 302. While in the waiting state, the lobby visitor makes continuous, periodic requests to join the meeting, as indicated by item 304. These requests ultimately reach a decision maker, such as each of the meeting presenters or other individuals having the authority to allow the visitor to join the meeting.

When a lobby visitor in the waiting state is granted permission to join the meeting, the lobby visitor is placed in a granted state 306. In this state, the lobby visitor is not a lobby visitor per se, but a participant in the meeting, and the lobby visitor is removed from the lobby and placed into the meeting, which is represented, for example, by a meeting attendee console. Alternatively, if a lobby visitor in the waiting state is denied permission to join the meeting, the lobby visitor is placed in a denied state 308. In this state, the lobby visitor is removed from the meeting lobby as represented by, for example, the removal of a meeting lobby web page, and informed of the denied permission to join the meeting.

Figure 4:
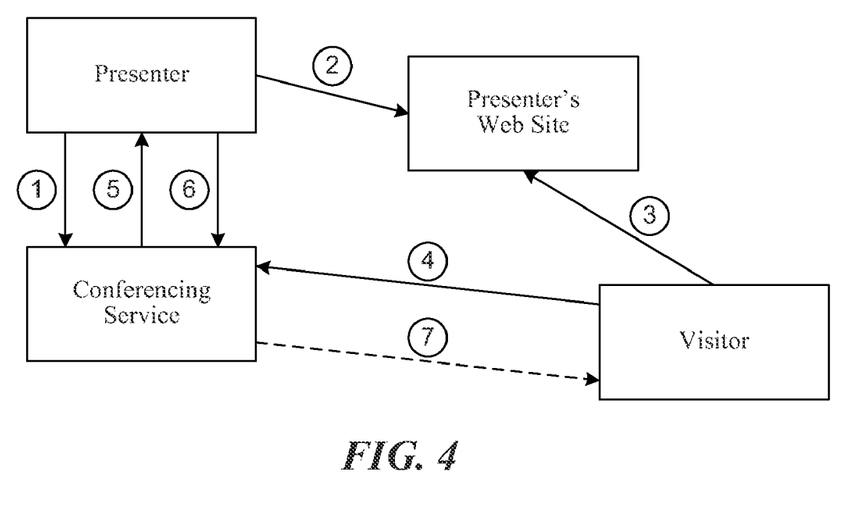
FIG. 4 is a diagram illustrating an example flow of information between a meeting presenter, the presenter's web site, a visitor, and a conferencing service, according to one embodiment.

FIG. 4 is a diagram illustrating an example flow of information between a meeting presenter, the presenter's web site, a visitor, and a conferencing service, according to one embodiment. By way of example, Roger, a teaching assistant in college, wanting to have scheduled virtual office hours on Tuesdays and Thursdays between 10 AM and 11 AM, schedules the virtual meetings, each with a meeting lobby with the conferencing service (stage 1). Roger then posts his scheduled office hours and the location of the meeting lobby on his department website (stage 2).

Sue, a student in one of Roger's sections, discovers Roger's office hours and the location of the meeting lobby from Roger's department website (stage 3). At one of the scheduled office hours, Sue enters the meeting lobby (stage 4). In response, the scheduling service notifies Roger that Sue is waiting in the meeting lobby (stage 5). Since Roger is presently not with another student, Roger grants Sue permission to enter the meeting—i.e., virtual office (stage 6). In response, the conferencing service admits Sue into the meeting (stage 7). Once in the meeting, Sue and Roger are able to converse with each other.

Figure 5:
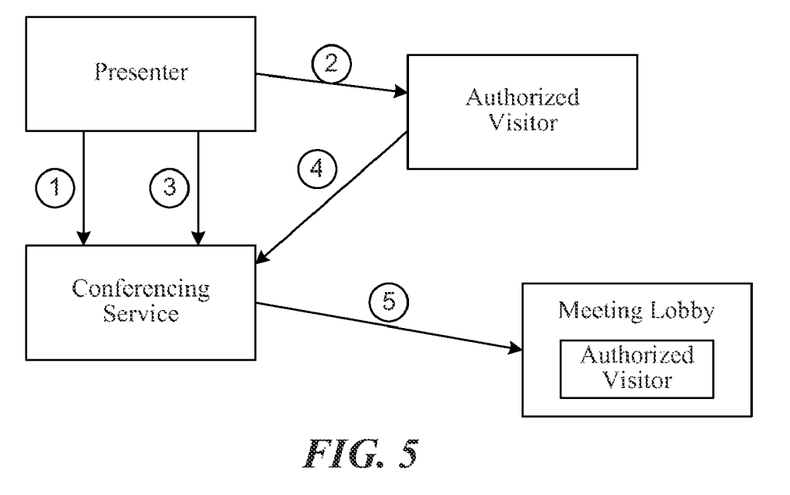
FIG. 5 is a diagram illustrating an example flow of information between a meeting presenter, the presenter's web site, another presenter in the meeting, and a conferencing service, according to one embodiment.

FIG. 5 is a diagram illustrating an example flow of information between a meeting presenter, the presenter's web site, another presenter in the meeting, and a conferencing service, according to one embodiment. Continuing the above example, Roger, wanting to conduct a special test review session for his students this upcoming Friday between 7 PM and 8 PM, schedules a virtual meeting with a meeting lobby with the conferencing service (stage 1). In addition to posting the time of the review session and the location of the meeting lobby, Roger tells Dianne, a student in one of his sections, a meeting password, which authorizes Dianne to directly enter the meeting without having to enter the meeting lobby (stage 2).

At 7:10 PM on Friday, Roger starts the meeting—i.e., review session—and, not wanting to be disturbed, locks the meeting (stage 3). At 7:15 PM, Dianne, wanting to enter the meeting, submits the meeting password to the conferencing service (stage 4). The conferencing service determines that Dianne is authorized to enter the meeting, but, because the meeting has been locked, sends Dianne to the meeting lobby (stage 5). The conferencing service may provide Roger a notification that Dianne is waiting in the meeting lobby.

Figure 6:
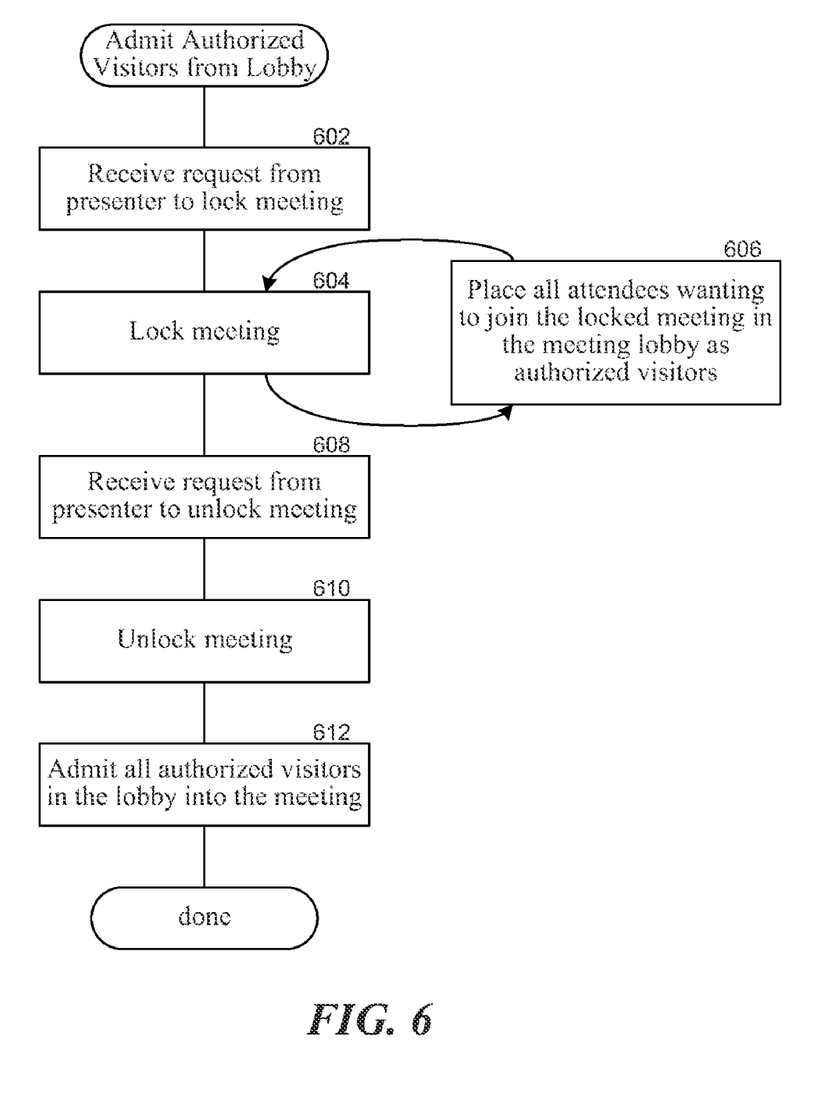
FIG. 6 is a flow diagram that illustrates the processing of the scheduling service when admitting authorized visitors in a meeting lobby, according to one embodiment.

FIG. 6 is a flow diagram that illustrates the processing of the scheduling service when admitting authorized visitors in a meeting lobby, according to one embodiment. A meeting presenter may have scheduled a meeting with a meeting lobby. The meeting presenter may have also established a meeting password, which may be used to directly enter the meeting as an attendee, and provided the meeting password to a number of people. In block 602, the scheduling service receives a request to lock a meeting from a presenter in the meeting. In block 604, the scheduling service locks the meeting, which prohibits additional people from entering the meeting.

In block 606, the scheduling service places all authorized attendees requesting to enter the locked meeting—i.e., people requesting to enter the meeting by submitting the meeting password—into the meeting lobby. The scheduling service identifies these people in the lobby as authorized visitors. Subsequently, in block 608, the scheduling service receives a request to unlock the locked meeting from a presenter in the meeting. In block 610, the scheduling service unlocks the locked meeting. In block 612, the scheduling service admits all the authorized visitors that are waiting in the lobby into the meeting. The authorized visitors would have directly entered the meeting had the meeting been unlocked at the time these visitors requested to enter the meeting by submitting the meeting password.

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A method, performed by a handheld device having a memory and a processor, the method comprising:

sending to a conferencing service a request to admit a first visitor to a virtual meeting having an associated lobby;

receiving from the conferencing service, a lobby page indicating that the first visitor has been admitted to the lobby of the virtual meeting pending a decision on whether the first visitor can be admitted to the virtual meeting;

in response to receiving an indication that the first visitor can be admitted to the virtual meeting, displaying, by the handheld device, an indication that the first visitor has been admitted to the virtual meeting; and in response to receiving an indication that the first visitor cannot be admitted to the virtual meeting, displaying, by the handheld device, a message indicating that the first visitor has been denied admission to the virtual meeting.

2. The method of claim 1 wherein the handheld device is a smart phone.

3. The method of claim 1 wherein the handheld device is a mobile phone.

4. The method of claim 1 wherein the lobby page is configured to enable interaction between a virtual meeting organizer and at least one visitor who has requested admission to the virtual meeting.

5. The method of claim 4 wherein the received lobby page is further configured to enable interaction between visitors who have requested admission to the virtual meeting.

6. The method of claim 5 wherein the visitors who have requested admission to the virtual meeting comprise at least one authorized visitor and at least one unauthorized visitor.

7. The method of claim 1 wherein the handheld device is configured to send the request without first receiving an invitation to the virtual meeting.

8. A computer-readable storage device storing instructions that, when executed by a computing system having a memory and a processor, cause the computing system to perform operations comprising:
   sending to a collaboration service a request to admit a first user to a lobby associated with a collaboration session;
   receiving a lobby page indicating that the first user has been admitted to the lobby pending a decision on whether to admit the first user to the collaboration session; and
   in response to receiving an indication granting the first user admission to the collaboration session, displaying an audience console.

9. The computer-readable storage device of claim 8 wherein the computing system is a smart phone.

10. The computer-readable storage device of claim 8 wherein the computing system is a mobile phone.

11. The computer-readable storage device of claim 8 wherein the computing system is a cell phone.

12. The computer-readable storage device of claim 8 wherein the computing system is a handheld device.

13. The computer-readable storage device of claim 8 wherein the computing system is a personal digital assistant.

14. The computer-readable storage device of claim 8, the operations further comprising:
   in response to receiving an indication that the first visitor has been denied admission to the collaboration session, displaying a message indicating that the first visitor has been denied admission to the virtual meeting.

15. A computing system, having a memory and a processor, the computing system comprising:
   a component that provides a first online collaboration session having an associated lobby page through which visitors may interact prior to joining the first online collaboration session;
   a component that receives a request from a first phone to join the first online collaboration session; and
   a component that, responsive to receipt of the request from the first phone to join the first online collaboration session, directs the first phone to the lobby page prior to the start of the first online collaboration session
   wherein at least one of the components comprises executable instructions stored in memory for execution by the processor.

16. The computing system of claim 15 wherein the first phone is a smart phone.

17. The computing system of claim 15 wherein the first phone is a mobile phone.

18. The computing system of claim 15, further comprising:
   a component that disables the lobby page so that the lobby page is not accessed.

19. The computing system of claim 15, further comprising:
   a component that receives a request from a second phone to join a lobby associated with a second online collaboration session.

20. The computing system of claim 19 wherein the second phone is admitted to the lobby associated with the second online collaboration session but denied admission to the second online collaboration session.

* * * * *